Jan. 17, 1956  M. E. DE REUS  2,731,374
INSULATION FOR SPHERICAL SURFACES
Filed April 11, 1952

Inventor
MARINUS E. DE REUS

By Rule and Hoge.
Attorneys

United States Patent Office 2,731,374
Patented Jan. 17, 1956

2,731,374
INSULATION FOR SPHERICAL SURFACES

Marinus E. De Reus, Toledo, Ohio, assignor to Owens-Illinois Glass Company, a corporation of Ohio Application April 11, 1952, Serial No. 281,778

4 Claims. (Cl. 154—44)

This invention relates to insulation for spherical surfaces and more particularly to such insulation utilizing rectangular blocks of insulating material.

In the present manufacture of insulation material, common commercial practice is to make the insulation in the form of rectangular blocks. For insulating spherical surfaces it is necessary to do considerable cutting and fitting of this rectangular block resulting in great waste in time and material. An alternative is to form the insulation in the particular shape of the surface to be insulated, but this is not practical or economical.

It is therefore an object of this invention to provide insulation for spherical surfaces utilizing rectangular blocks of insulating material.

Other objects of the invention will appear hereinafter.

Basically the invention comprises providing grooves in one face of the block extending to the extremities thereof and through substantially or nearly the entire thickness of the block. The grooves are at angles of approximately 60 degrees to each other thus forming equilateral sections. When the block is placed on a spherical surface with the grooves adjacent to the surface and pressed to shape it to the surface, it tends to flex along the grooves, thereby conforming to the surface. A sheet of flexible material is adhered to the other face of the block to retain the sections and provide a unitary exposed surface.

Referring to the accompanying drawings.

Figure 2:
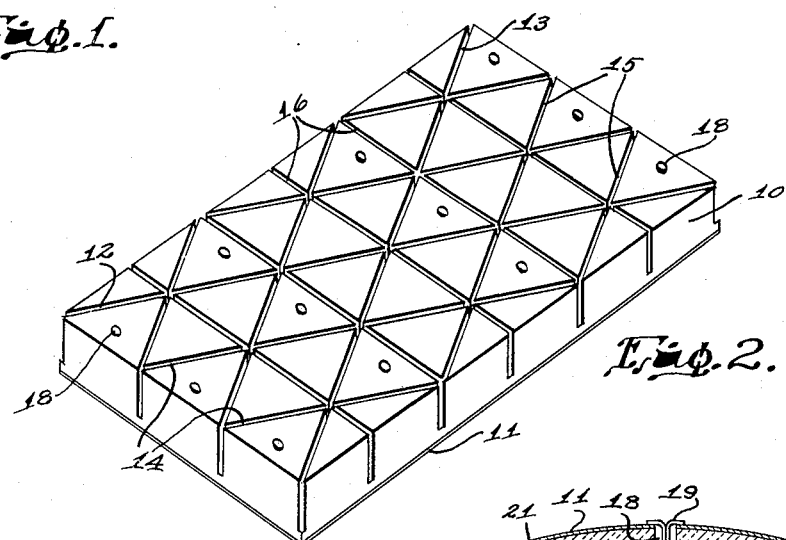
Fig. 2 is an isometric of a block of insulating material embodying the invention.

Referring to Fig. 2, which shows a block embodying my invention, a rectangular block 10 of insulating material has a sheet 11 of flexible material adhered to one face thereof. The insulating material is preferably a lightweight, fire-proof material such as hydrous calcium silicate with a spiculated asbestos fiber binder. The block of insulating material is non-compressible, form-retaining and unitary. Such a material is now on the market under the trade name Kaylo and is disclosed in the patent to Lewis D. Fraser entitled "Heat Insulating Material and Method of Making," Patent No. 2,469,379, issued May 10, 1949. The sheet material may consist of any suitable flexible sheet having the necessary tensile strength, as hereinafter described.

The block is provided on the other face thereof with a series of grooves extending to the extremities thereof. The grooves are positioned to form triangular sections which are substantially equilateral in shape. Sections of this shape have been found to more universally cover a spherical surface with the minimum of exposed surface. In addition, when rectangular blocks are applied to a spherical surface, the remaining exposed surfaces are most nearly at included angles of 30° and 60° and thus a rectangular block embodying grooves at these angles may be cut along the grooves to provide a piece of the necessary shape to complete the insulation of the spherical surface.

The block shown in Fig. 2 has the grooves cut in a symmetrical pattern. In this particular block the ratio of length to width is 2:1. The grooves include diagonal grooves 12 and 13; a series of equally spaced grooves 14 parallel to one diagonal 12; a second series of equally spaced grooves 15 parallel to the other diagonal 13; a third series of equally spaced grooves 16 extending through the points of intersection of the grooves 14 and 15. The distance between each of the parallel series of grooves is equal so that triangular sections which are substantially equilateral are formed.

Figure 3:
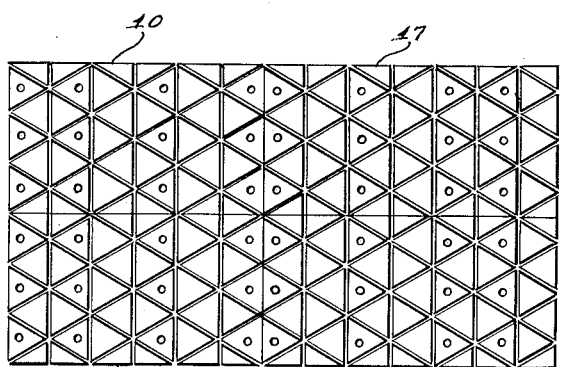
Fig. 3 is a plan view of a series of blocks embodying the invention.

The grooves may also be formed in the block in an asymmetric manner provided that the triangular sections formed are substantially equilateral. As shown in Fig. 3, blocks 17 are not symmetrically grooved. However, the grooves are at angles of substantially 60° to each other.

Figure 1:
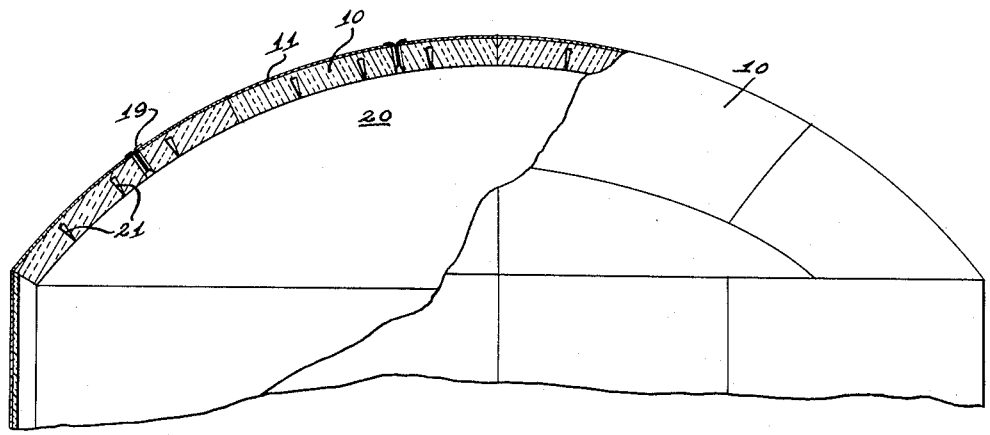
Fig. 1 is a part-sectional elevational view of the blocks applied to a spherical surface.
Figure 4:
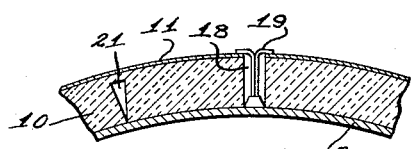
Fig. 4 is a fragmentary part-sectional view of a block applied to a spherical surface.

Referring to Figs. 1 and 4, when a block is applied to a spherical surface, it tends to flex along the grooves, thereby conforming to the surface. The sheet 11 of flexible material tends to retain the block in a unit, preventing the sections from breaking up. If the space to be covered is less than the size of a block, a block may be cut along the grooves to provide a section of the desired configuration. The utilization of grooves at 60° insures that the sections are shaped so as to fill the remaining spaces without cutting or trimming in the majority of instances.

The sheet 11 of flexible material adhered to the block may consist of any suitable material which has sufficient tensile strength to keep the sections together and which may be adhered satisfactorily to the block. I have found glass fiber fabric, asbestos cloth, and canvas to be among the satisfactory materials.

Glass fiber fabric is a preferred material since it not only has the necessary tensile strength but is also permeable thus permitting the adhering material to thoroughly penetrate the fabric and bond it to the face of the insulating block.

The blocks may be retained in position on the spherical surface by any desired method. For example, holes 18 may be drilled at various points in the block and the block held in place by studs 19 on the surface 20 (Fig. 4).

Referring to Fig. 4, each of grooves 21 preferably extends through the greater portion of the thickness of the block. The width of each groove must be such as to permit flexing of the sections of the block along the grooves sufficiently to conform to the surface being covered. The width of the groove must be greater if the thickness of the block is greater; it must be greater if the diameter of the surface to be covered is smaller. For most purposes, a single width of the grooves may be used which will be satisfactory. For example, a width of ¼ inch is suitable where the block has a thickness of approximately 2 inches.

It can readily be seen that a block made in conformity with the invention provides an insulation for spherical surfaces which is easily manufactured, readily handled and applied, and provides satisfactory insulation without cutting, trimming or special fitting usually inherent in insulating spherical surfaces.

Modifications may be resorted to within the spirit and scope of the appended claims.

I claim:

1. Insulation for spherical surfaces comprising a unitary block of form-retaining, non-compressible insulating material, a sheet of flexible material adhered to one face of said block, said block having a multiplicity of members formed by intersecting grooves in the other face thereof extending partly through the entire thickness of the block and through the greater portion of the thickness, each said groove extending in a straight line to the extremities of said block, the intersecting grooves defining angles of approximately 60° with each other, said grooves forming lines of weakness in said block whereby, when the block is placed on a curved surface with the grooves adjacent to the surface and pressure is applied thereto, the block will flex along said grooves and will conform to the surface, said grooves having substantially parallel walls spaced apart at such distance that when the block is so flexed the said surfaces are convergent with the edges of the grooves brought together at the face of the block opposite from that to which the said sheet is adhered, said sheet retaining the block as a single, integrated unit when it is flexed along the grooves with entrapped air in said grooves forming dead air spaces, and a layer of the block material separating the grooves from the said sheet of flexible material.

2. Insulation for spherical surfaces comprising a unitary block of form-retaining, non-compressible insulating material, a sheet of flexible material adhered to one face of said block, said block having a multiplicity of members formed by a plurality of series of equally spaced parallel grooves in the other face thereof extending partly through the thickness of the block and through the greater portion of the entire thickness, said grooves including a first series of said grooves extending to the extremities of said block and forming an angle of approximately 60° with one side of said block, a second series of equally spaced grooves extending to the extremities of said block and forming an angle of approximately 60° with said first series of grooves, and a third series of equally spaced parallel grooves extending to the extremities of said block through the points of intersection of the grooves of said first and second series, the distance between the parallel grooves in one series being equal to the distance between the grooves in each of the other series, said grooves forming lines of weakness in said block whereby, when the block is placed on a curved surface with the grooves adjacent to the surface and pressure is applied thereto, the block will flex along said grooves and will conform to the surface, said grooves having substantially parallel walls spaced apart at such distance that when the block is so flexed the said surfaces are convergent with the edges of the grooves brought together at the face of the block opposite from that to which the said sheet is adhered, said sheet retaining the block as a single, integrated unit when it is flexed along the grooves, with entrapped air in said grooves forming dead air spaces and a layer of the block material separating the grooves from the said sheet of flexible material.

3. The article defined in claim 1, the said block being rectangular, the grooves comprising one set of parallel equally spaced grooves parallel with opposite edges of the block, and the remaining grooves being at angles of 60° to said parallel grooves.

4. The article defined in claim 3, the said grooves including two grooves each extending from one corner of the block to the diagonally opposite corner, the two grooves intersecting each other at the center of the block.

References Cited in the file of this patent

UNITED STATES PATENTS

| | | |
|---|---|---|
| 1,811,385 | Dietz | June 23, 1931 |
| 1,910,810 | Nash | May 23, 1933 |
| 1,978,632 | Hoff et al. | Oct. 30, 1934 |
| 2,365,086 | Kamowski | Dec. 12, 1944 |
| 2,470,986 | Jackson | May 24, 1949 |

FOREIGN PATENTS

| | | |
|---|---|---|
| 4,918 | Great Britain | Apr. 15, 1900 |